April 2, 1935.  W. B. THURMAN  1,996,129
MACHINE FOR APPLYING RUBBER TO TIRES
Filed Sept. 3, 1932

INVENTOR
Wᵐ B. Thurman
BY 
ATTORNEY

Patented Apr. 2, 1935

1,996,129

UNITED STATES PATENT OFFICE 1,996,129

MACHINE FOR APPLYING RUBBER TO TIRES

William B. Thurman, Berkeley, Calif., assignor to Super Mold Corporation, Lodi, Calif., a corporation of Nevada Application September 3, 1932, Serial No. 631,665

1 Claim. (Cl. 154—9)

This invention relates to tire treading and particularly represents modifications over the structure for and the method of applying tread rubber to tires shown in the co-pending application for patent of H. J. Woock, Serial No. 615,641, filed June 6, 1932.

In this co-pending application it was contemplated to obtain the necessary pressure of the rubber with the tire as the rubber is being applied, and for the full width of the tread portion of the tire by inflating the tire, and pressing the same against an unyielding roll sufficient to cause the tire to be flattened where it engages with the roll against the resistance of the compressed air within the tire for the width of the tread portion or that of the strip of rubber being applied. The rubber strip is fed between the tire and roll at the point of contact of the two, so that the rubber is firmly but yieldably pressed into the roughened and relatively porous surface of the tire.

In the present invention on the other hand the tire becomes the non-yielding member and hence is not flattened or distorted while the member with which it is in contact is yieldable in order to obtain the necessary pressing contact of the rubber with the tire, and to cause the rubber to conform to the rounded contour of the tread portion. As a result the effectiveness of the previous method is retained while the mechanism by which this method is carried out may be simplified in certain respects.

These objects I accomplish by means of such structure and relative arrangement of parts as will fully appear by a perusal of the following specification and claim.

In the drawing similar characters of reference indicate corresponding parts in the several views.

Figure 1:
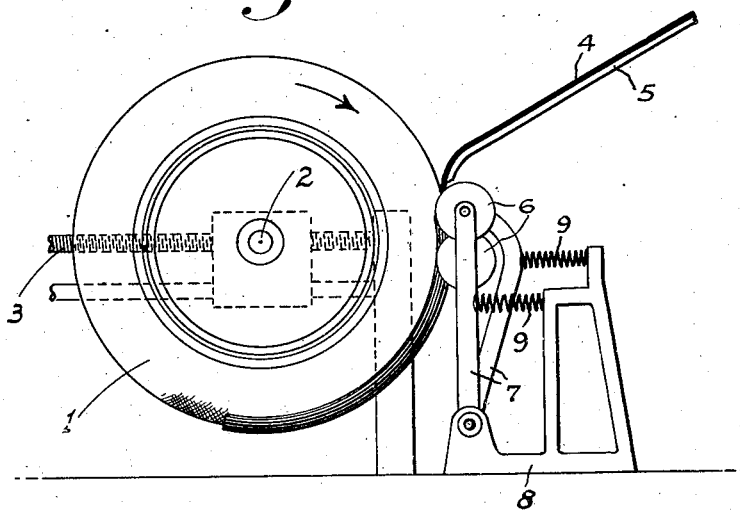
Fig. 1 is a somewhat diagrammatic side elevation of the apparatus as in operation.
Figure 2:
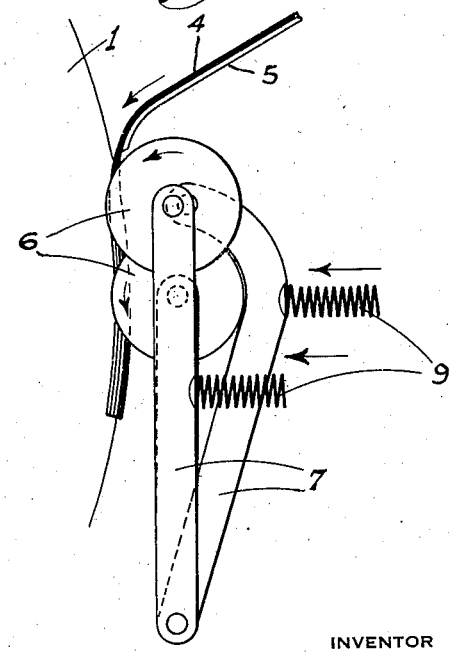
Fig. 2 is a fragmentary side view showing the apparatus somewhat enlarged.

Referring now more particularly to the characters of reference on the drawing, the numeral 1 denotes the tire to be treaded which is turnably mounted on a horizontal spindle 2 supported for horizontal movement at right angles to its axis on a screw shaft 3 or the like. Before thus mounting the tire on the spindle it is inflated so as to be relatively non-yielding.

Figure 3:
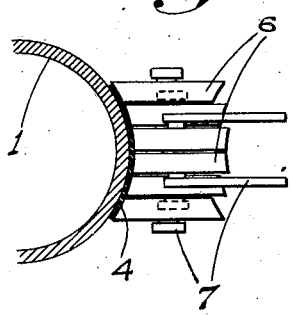
Fig. 3 is a top plan view of the same.
Figure 3:

The unvulcanized rubber to be applied to the tire is preferably in the form of a strip 4 initially supported and fed along an apron 5 which extends tangent to the upper surface of the drum in the direction of rotation of the tire; said tire being rotated by any siutable means. A short distance above the point of contact of the drum with the tire the rubber engages the drum and passes under and is engaged by a plurality of rollers 6. These rollers are disposed in close side by side and circumferentially spaced relation and are peripherally shaped so as to form a unit which closely follows the transverse curvature of the tread portion of the tire, as shown in Fig. 3. These rollers are mounted on separate arms 7 which are separately pivoted on a suitable supporting frame 8. Individual springs 9 applied to the different arms act to yieldable hold the rollers against the tire, the pressure exerted by the rollers against the rubber strip 4 being applied depending of course on the strength of the springs.

In operation the tire is advanced against the rollers until the periphery of the latter follow the contour of and press against the tread portion of the tire for its full width, as shown in Fig. 3. The rubber strip 4 as fed between the oppositely rotating tire and rollers is therefore pressed firmly into the roughened surface of the tire throughout the full width of the tread portion thereof. This insures a firm bond between the tire and rubber being had and avoids the need of applying cement to the tire. At the same time the pressure imparted to the tire is yieldable so that the rubber does not tend to be squeezed laterally and clear of the contacting surface. It is of course to be understood that the surface of the drum is of such material or is so treated that the rubber will not adhere thereto.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention what I claim as new and useful and desire to secure by Letters Patent is:

Means for applying tread rubber to a tire of rounded cross section comprising rotary mounting means for a tire, a plurality of separate rollers disposed in close alinement transversely of the tire and arranged as a unit to follow the transverse rounded contour of the tread portion of the tire, means separately mounting the rollers for movement toward and from the tire, means yieldably acting on the roller mounting, means to hold the rollers pressed against the tire, and means to feed the tread rubber between the tire and rollers.

WILLIAM B. THURMAN.